Jan. 23, 1945. O. A. KEHLE 2,367,682
LANDING GEAR BY-PASS VALVE
Filed April 9, 1943 3 Sheets-Sheet 3

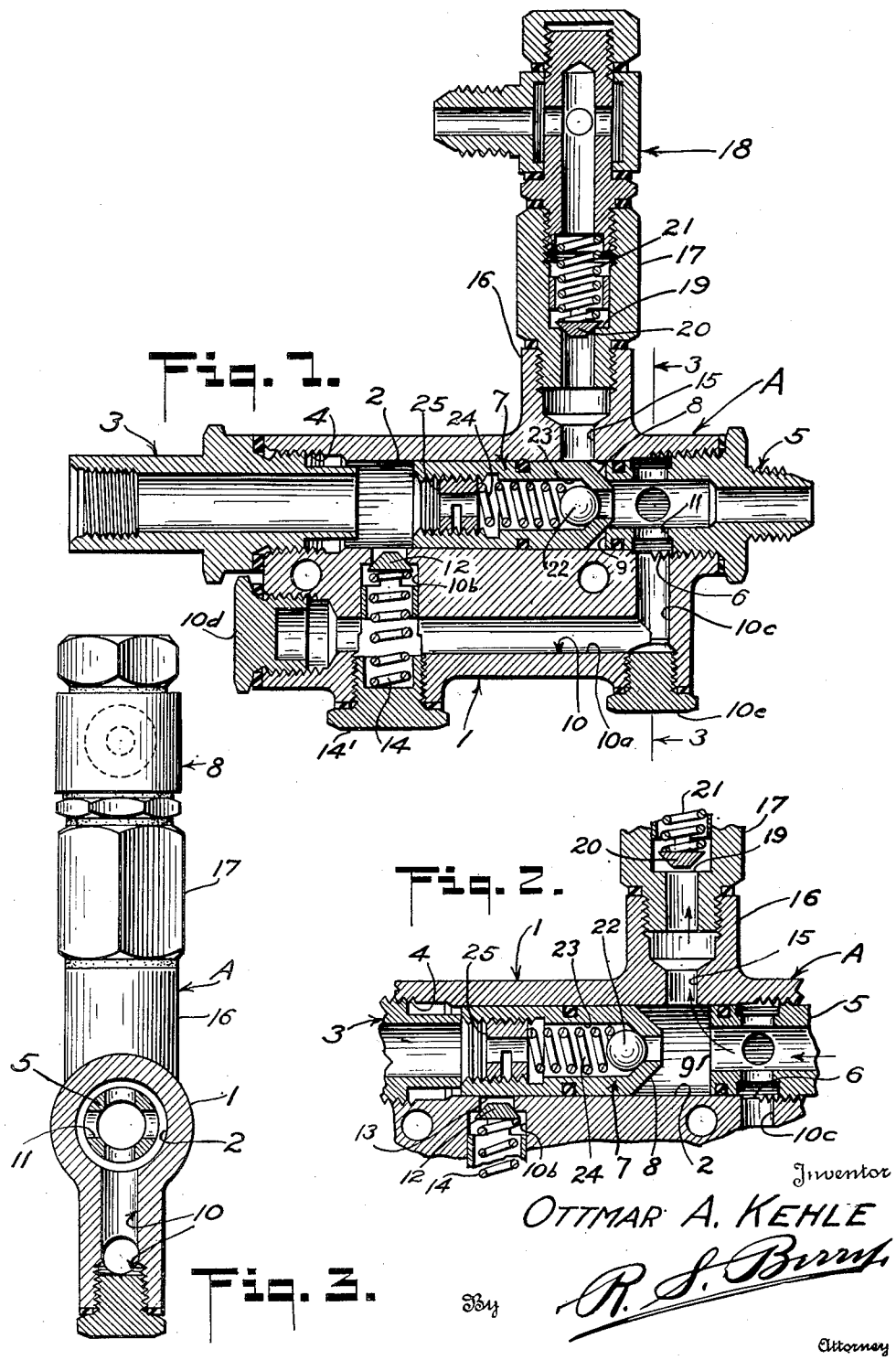

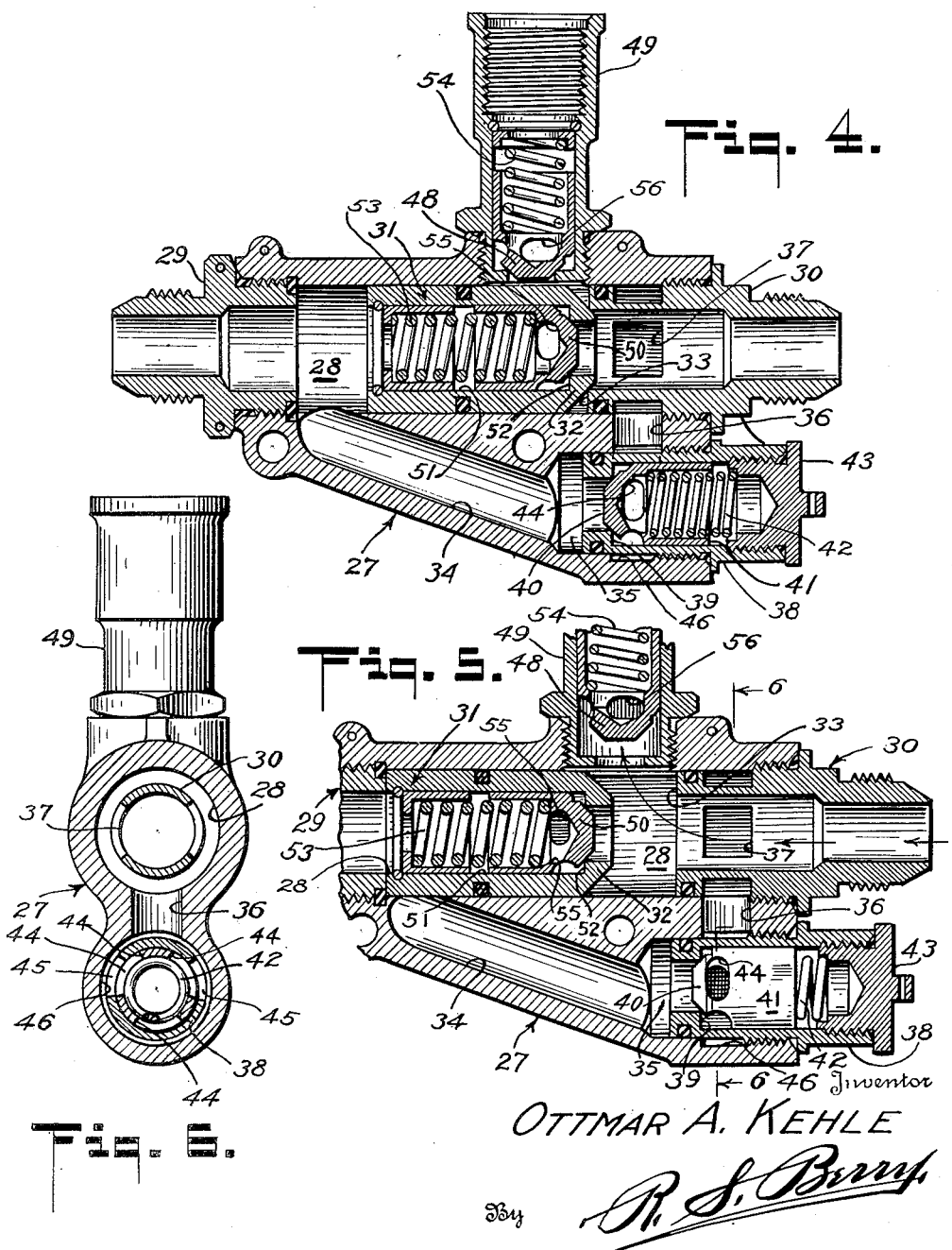

Inventor
OTTMAR A. KEHLE
By R. S. Berry
Attorney

Patented Jan. 23, 1945

2,367,682

UNITED STATES PATENT OFFICE 2,367,682

LANDING GEAR BY-PASS VALVE

Ottmar A. Kehle, Van Nuys, Calif., assignor to Adel Precision Products Corp., a corporation of California Application April 9, 1943, Serial No. 482,469

7 Claims. (Cl. 121—38)

This invention relates to aircraft landing gear by-pass valves of the type shown in United States Letters Patent No. 2,267,284, issued December 23, 1941, to C. B. Livers, for controlling the flow of hydraulic fluid in the landing gear actuating cylinders and circuits so as to prevent evacuation of the upper end of the cylinders and cavitation of the pump and pressure lines during the lowering of the landing gear.

The primary object of the present invention is to provide a valve of the character described which embodies improvements over similar valves in that it is simplified as to the construction and arrangement of the ports, passages and various parts and elements thereof, consists of fewer working parts, is reduced as to weight, may be made at a lower cost, requires less servicing and parts replacement over longer periods of use, and is more efficient and reliable as to performance.

An important object of my invention is to provide a by-pass valve of the character described which is constructed, arranged and operated to prevent hydraulic locking of the piston valve thereof and consequent failure of the device to by-pass fluid from one end of the cylinder to the other, this objection being encountered with by-pass valves heretofore used, wherein the piston valve must be given a considerable movement to open the by-pass port and wherein a cavity producing a vacuum is formed in the piston-valve bore before the piston is moved sufficiently to open the by-pass port.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a sectional view of a by-pass valve embodying my invention;

Fig. 2 is a fragmentary sectional view showing the valve as it would appear when by-passing fluid from one end of a hydraulic cylinder to the other;

Fig. 3 is a vertical sectional view taken on the line 3—3 of Fig. 1;

Fig. 4 is a sectional view of a modified form of my invention;

Fig. 5 is a fragmentary sectional view of the modified valve shown in Fig. 4 as it would appear when by-passing fluid from one end of the cylinder to the other;

Fig. 6 is a vertical sectional view taken on the line 6—6 of Fig. 5;

Figure 7:
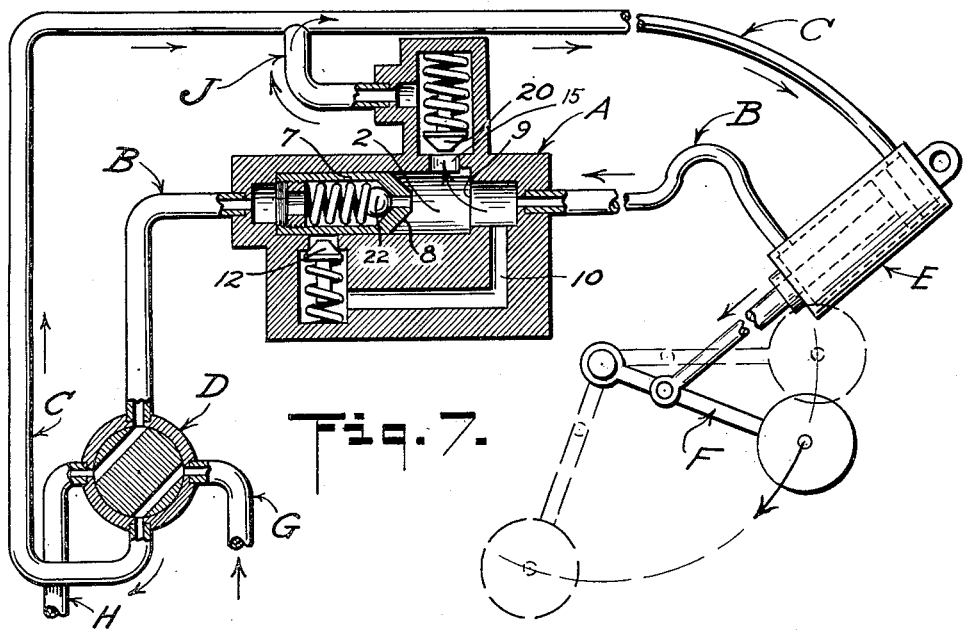
Fig. 7 is a schematic view of a hydraulic system for actuating landing gear showing my improved by-pass valve as it would appear when the landing gear is being extended and indicating how the fluid is by-passed from the bottom to the top of the cylinder.
Figure 8:
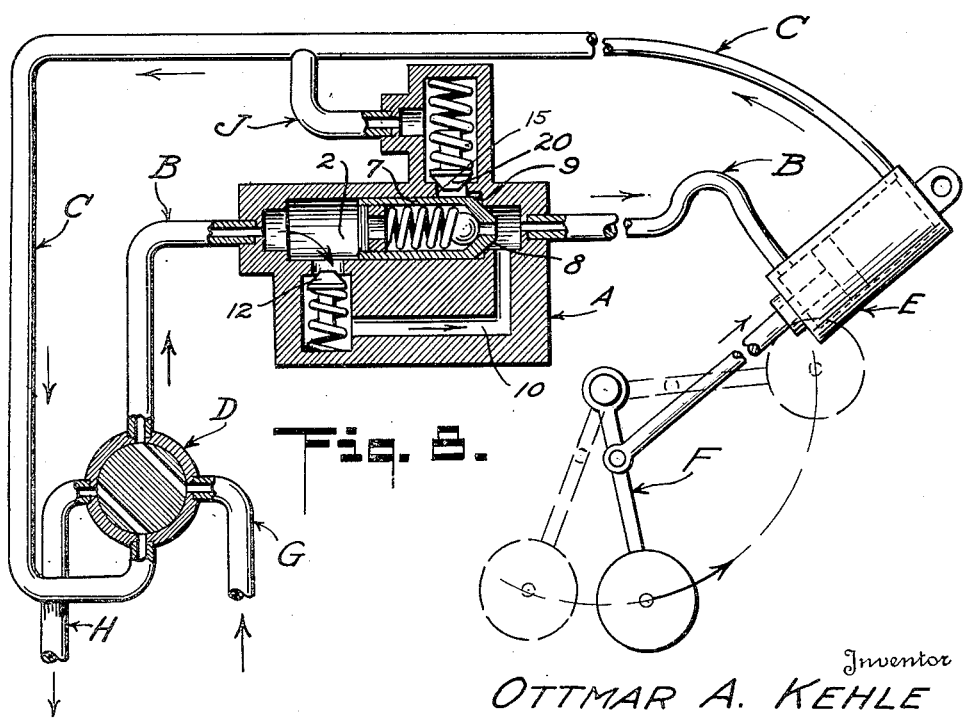
Fig. 8 is a schematic view similar to Fig. 7 but showing the by-pass valve as it would appear during retraction of the landing gear and the manner of the flow of pressure fluid when the gear is retracted.

Referring to the drawings more specifically, and particularly to the schematic illustrations in Figs. 7 and 8, it is seen that a by-pass valve A embodying my invention is connected in one of the two cylinder lines B and C (for example line B) leading from a 4-way control valve D to a hydraulic cylinder E for actuating the landing gear F of an airplane. Line G leads from the hydraulic pump (not shown) to the control valve D while a return line H leads from said valve to the reservoir (not shown). A by-pass line J is connected with the valve and the cylinder line C leading to the top of the cylinder so that when the landing gear is extended the by-pass valve A will be automatically operated to the position shown in Fig. 7 to by-pass fluid from the lower end of the cylinder to the upper end thereof. When the 4-way valve D is operated to retract the landing gear, the pressure fluid flows through the by-pass valve to the lower end of the cylinder as shown in Fig. 8.

It should be noted that inasmuch as the extension of the landing gear is largely effected by force of gravity, the piston of the cylinder expels the fluid from the lower end of the cylinder faster than the pump can supply pressure fluid to the upper end of the cylinder, but with my by-pass valve arranged in the circuit as shown in Figs. 7 and 8 the fluid from the lower end of the cylinder is by-passed to the upper end of the cylinder, thereby preventing evacuation of the cylinder and any objectionable operation, or operation failure which would obviously attend such a disproportionate flow of fluid.

In addition to by-passing fluid as aforesaid, the valve A acts to direct fluid from the lower end of the cylinder through the 4-way valve D into the return line H when the pressure of the operating fluid above the piston in the cylinder E exceeds the pressure of the fluid discharging from the lower end of the cylinder as is the case when the gravitational movement of the landing gear ceases and the pressure fluid operates the cylinder to move the landing gear into its completely extended position where it becomes mechanically locked in a manner well known to those skilled in the art, but not here shown.

Reference is now had to Figs. 1, 2 and 3, wherein the valve A is shown as including an elongated body member 1 having a bore 2 extending longitudinally therethrough. At one end of this bore is a connection fitting 3 screwed into a threaded enlargement 4 for connection of a section of the cylinder line B therewith, while at the other end of the bore a similar fitting 5 is screwed into a threaded enlargement 6 to provide for the connection thereto of the other section of the cylinder line B which leads to the lower end of the cylinder as shown in Fig. 7.

A piston valve 7 having a working fit in the bore 2 is provided at one end with an integral conical valve member 8 adapted to seat against an annular seat 9 of smaller diameter than the piston proper and formed on the inner end of the fitting 5.

When pressure fluid is directed through the fitting 3 into the bore 2 for retracting the landing gear, the piston valve 7 is shifted by the pressure fluid so that the valve end 8 seats on the seat 9, moving from position shown in Figs. 2 and 7 into position shown in Figs 1 and 8.

When thus shifted the piston uncovers a passage 10 which opens into one end of the bore 2 and leads through the body to the other end of said bore, so that pressure fluid by-passes the then seated piston valve and will flow out through the fitting 5 to the lower end of the cylinder E. In this connection it is seen that the fitting 5 has radial ports 11 affording communication between the passage 10 and the bore through the fitting 5, or generally speaking, a connection between the bore 2 and passage 10.

As the piston valve 7 proper, apart from the valve member 8 thereon, has a greater diameter than the seat 9, it is apparent that the pressure fluid will hold the piston valve seated while the passage 10 is open for delivery of pressure fluid to the lower end of the cylinder. A check valve 12 of the disk type is provided in the passage 10 adjacent the end thereof opening into the bore near the fitting 3, said valve seating against a seat 13 in a direction toward the bore 2 so that when the passage 10 is uncovered by the piston valve 7, as shown in Figs. 1 and 8, the pressure fluid will open the valve against the action of the valve spring 14. This spring is engaged at its ends with an adjustable screw plug 14' and the valve 12 and is tensioned so that the valve will be unseated by the normal pump pressure for actuating the cylinder E.

When the landing gear is unlatched, in a manner not here shown, preparatory to its extension, the 4-way valve being set as shown in Fig. 7, so that pressure fluid will flow through the line C to the top of cylinder E, the landing gear will gravitate as indicated in Fig. 7 toward its extended position and force the fluid from the lower end of the cylinder E at a greater rate than that of the flow of operating fluid entering the top of the cylinder from the pump. When the landing gear begins its descent, the piston 7 is closed as shown in Fig. 8, but as soon as the return fluid commences to flow from the lower end of the cylinder through line B and fitting 5, the piston 7 will be shifted so as to unseat the valve member 8 thereon and will assume the position shown in Fig. 7, whereby fluid will flow through the by-pass line J, thence through line C to the top of the cylinder so that the proper volume of fluid will be maintained above the piston during the extension of the landing gear.

When the piston 7 is moved to unseat the valve 8 as shown in Fig. 7, it opens a port 15 leading from the bore 2 adjacent the valve seat 9, into a nipple 16 formed on the body member 1. Screwed into this nipple is a tubular fitting 17 to which is coupled a connection fitting 18 connecting the by-pass line J to the cylinder line C.

In the fitting 17 is a valve seat 19 for a spring loaded by-pass check valve 20 of the disk type which seats toward the nipple. Inasmuch as the pressure of the return fluid from the cylinder during the gravitational extension of the landing gear is greater than that of the pressure fluid (plus the force of the spring 21) operative to seat the valve 20 due to the greater rate of egress than ingress of fluid relative to said cylinder, the valve 20 will be opened to allow the by-passing of the fluid from the lower to the upper end of the cylinder as hereinbefore pointed out.

As soon as the gravitational movement of the landing gear ceases, as takes place before the movement of the gear into fully extended position in which it becomes automatically latched and held, the pressure of the return fluid becomes less than that of the pressure fluid above the valve 20 and in the upper end of the cylinder E, whereupon the valve 20 is pressure seated and the piston in the cylinder E is moved to thrust the landing gear into finally extended position and latch it in such position. During this operation the fluid returned from the lower end of the cylinder E into the bore 2 builds up a pressure in said bore until a relief check valve 22 of the ball type controlling a passage 23 through the piston 7, is forced open and the return fluid then passes through the piston passage 23, bore 2, fitting 3, and back to the reservoir (not shown). A spring 24 having a tension adjusting means 25 is set to hold the valve 22 seated while the pressure of the fluid returning during gravitational movement of the landing gear, is greater than the pump operating pressure against the upper side of the piston and the valve 20. For this reason the valve 20 will be unseated during gravitational movement of the landing gear into extended position while the relief valve 22 remains seated. However, when the pressure of the operating fluid in line C and the upper end of the cylinder exceeds that of the return fluid, following gravitational movement of the landing gear, this higher pressure plus the force of the spring 21 holds the valve 20 seated while the return fluid pressure builds up to a pressure sufficient to open the relief valve 22 in the piston.

It should be noted that the conical valve member 8 on the piston 7, and the valve seat 9 are arranged so that the annular space formed in the bore 2 around the valve member 8 when the latter is being seated, opens into the port 15 leading to the valve 20 thereby preventing the trapping of fluid in the bore between the piston 7 and valve seat 9.

It should be noted that passage 10 is formed by making a bore 10a longitudinal from one end of the body member 1 to parallel the bore 2 and which terminates adjacent but spaced from the opposite end of the body member, then making bores 10b and 10c from one side of the body member so as to intersect the bore 10a and extend at right angles thereto, to points of communication with the bore 2 near the ends of the latter.

The outer ends of bore 10a and 10c are closed by plugs 10d and 10e respectively, whereas the outer end of bore 10b is closed by the adjustable plug 15 for regulating the valve spring 14 for valve 12.

This formation of the passage 10 and the provision of the check valve 23 in the passage 24 through the piston makes it unnecessary to machine extra bores and valve seats in the body 1 as heretofore required in landing gear by-pass valves and reduce the bulk, weight and manufacturing costs of the valve.

Referring now to Figs. 4, 5 and 6, it is seen that a modified form of my invention includes a valve body member 27 of substantially triangular outline instead of the generally rectangular body member shown in Figs. 1, 2 and 3. This form of my improved valve has substantially the same number of working parts and operates in the same manner as the valve assembly shown in Figs. 1, 2, 3, 7 and 8, but differs as to the construction and location of certain parts to better adapt the unit for heavy duty.

The body member 27 as here shown is provided with a large bore 28 extending longitudinally therethrough and provided with connection fittings 29 and 30 at its ends, also a piston 31 reciprocable in said bore. The piston has an integral conical valve member 32 at one end adapted to seat against a seat 33 on the inner end of the fitting 30.

Extending diagonally from a point near the inner end of the fitting 29 where it opens into the bore 28 is a passage 34 which opens in a valve chamber 35 formed as bore leading from one end of the body member, and extending parallel to the bore 28. A port 36 affords communication between the chamber 35 and the portion of bore 28 which communicates with the interior of the fitting 30 through radial openings 37.

A cylindrical valve cage 38 is threaded into the chamber 35 and has an annular valve seat 39 provided interiorly thereof for a poppet check valve 40. The valve 40 has an integral cylindrical guide portion 41 arranged in a working fit within the cage 38 so as to be unseated by pressure fluid entering chamber 35 from the passage 34. A spring 42 is interposed between the valve 40 and a plug 43 turned in the outer end of the cage 38.

The guide 41 of the valve has radial ports 44 affording communication of the interior of the guide with the interior of the cage 35 which latter is likewise provided with ports 45 (see Fig. 6) opening into a counterbore 46 in the bore 28 to establish communication between the interior of the cage and the port 36.

When pressure fluid is directed through the fitting 29 into the bore 2 for the purpose of retracting the landing gear in the same manner as shown in Fig. 8, said fluid flows through the passage 34 into chamber 35 and opens the valve 40, then passes through the cage 38, ports 45, counterbore 46, port 36, radial openings 37, fitting 30, and to the hydraulic cylinder. The piston 31 is moved by the pressure fluid in the bore 28 so as to seat the valve 32 and hold it seated as shown in Fig. 4 during the flow of pressure fluid to retract the landing gear.

When return fluid from the lower end of the hydraulic cylinder is delivered through fitting 30 during gravitational extension of the landing gear, the pressure of said fluid shifts the piston 31 so as to unseat the valve 32. This movement of the piston exposes a by-pass check valve 48 mounted in a fitting 49 on the body 27 as shown in Fig. 5. This fitting is adapted to be connected to a cylinder line leading to the top of the cylinder in the same manner as shown in Figs. 7 and 8. As the rate of movement of the piston is greater than the rate of flow of pressure fluid in the line to which the fitting 49 is connected during gravitational movement of the landing gear, it is seen that the pressure in this fitting is reduced below that of the return fluid beneath the by-pass valve 48 wherefore said valve will open and allow the fluid to enter the top of the cylinder as shown in Fig. 7.

A relief check valve 50 is mounted in a bore 51 through the piston 31 to engage a seat 52 in said bore and operates in the same manner as the relief valve shown in Figs. 1 and 2. The valve 50 is of the disk poppet type as are the valves 40 and 48 and the springs 53 and 54 for these valves are relatively tensioned in the same manner as the corresponding springs in the first described form of my invention. Ports 55 in the valve 50 and similar ports 56 in the valve 48 provide for free flow of fluid when said valves are unseated.

As this modified form of my invention operates in the same manner as the first described form further description as to operation is deemed unnecessary. However, it should be noted that the diagonally extending passage 34 and associated ports and passages, with the valve 40 located at the opposite end of the valve body member 27 compared to the valve shown in Figs. 1 and 2, and the body 27 of substantially triangular form, I am able to provide relatively large ports and passages and a heavy duty by-pass valve assembly as a small, compact unit of comparatively light weight.

It is important to note that in both forms of my by-pass valve as here shown the piston valve upon being "cracked" or slightly unseated, will immediately establish communication of the by-pass port with the portion of the main bore into which the return fluid flows from the lower end of the hydraulic cylinder upon extension of the landing gear. Therefore the by-passing from the lower end of the cylinder to the upper end thereof will commence upon the initial shifting of the piston valve responsive to this return fluid and the desired by-passing action is assured. This immediate by-passing action is assured by employing a piston valve construction in which an annular space is defined around that portion of the piston valve which lies between the by-pass port and the seat for the piston valve when the latter is seated with this space affording an immediate communication between said port and said seat upon the initial minute movement of the piston valve. In other words, the piston valve does not at any time close the by-pass port and it is only necessary to give but a slight movement of this valve to expose the by-pass check valve to the pressure of by-passed fluid and thereby start the flow of such fluid to the top of the hydraulic cylinder.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a hydraulic by-pass valve, a valve body having a fluid passage extended therethrough, connection means on said body for coupling said passage in series with a fluid line for conducting pressure fluid to and returning fluid from one end of a hydraulic cylinder, a by-pass connection on said body for coupling said passage with a second fluid line for conducting pressure fluid to and returning fluid from the other end of said cylinder, a by-pass check valve means arranged to seat and close said by-pass connection responsive to pressure fluid in said second fluid line and to unseat and open said by-pass connection when the fluid returned from said one end of the cylinder to said passage reaches a pressure greater than the pressure of the fluid seating said check valve means, said body having a bore therein communicating at its ends with said passage, a piston valve arranged in said bore to move into position to shut off communication between said by-pass connection and said passage responsive to the passage of pressure fluid through said passage for delivery to said one end of the cylinder, and to move into position affording communication of said by-pass connection with said passage responsive to the return of fluid from said one end of the cylinder to said passage, a check valve means arranged to close said passage at a point between the points of communication of said bore with the passage responsive to the flow of return fluid into said passage from said one end of the cylinder, said piston valve having a relief port extended therethrough for conducting return fluid from said passage through said bore and out of said valve body while the check valve in said passage is closed; and a relief check valve arranged in said port to be seated and close said port while the pressure of return fluid in the passage is greater than the pressure of the operating fluid holding the by-pass check valve seated, and to be opened by pressure of the return fluid when the pressure of the return fluid is less than that of the operating fluid seating said by-pass check valve, there being in said bore a valve seat of smaller diameter than said piston valve, the latter having a frusto-conical end engageable with said valve seat.

2. In a hydraulic by-pass valve, a valve body of substantially triangular outline having a bore extended therethrough, connection means on said body for coupling the bore in series with a fluid line for conducting pressure fluid to and returning fluid from one end of a hydraulic cylinder, a passage in said body having its ends arranged to open into the end portions of said bore, a check valve intermediate the ends of said passage arranged to open incident to the flow of pressure fluid into said passage from said bore and to close responsive to the flow of return fluid into said passage from said bore, a by-pass connection on said body having communication with said bore, and adapted for coupling said bore with another fluid line through which pressure fluid is directed to and fluid is returned from the other end of the hydraulic cylinder, whereby return fluid may be directed from said one end of the cylinder to the other end of the cylinder; a by-pass check valve arranged to be seated to close said by-pass connection, by pressure of fluid in the fluid line coupled to said by-pass connection and to be unseated and open said by-pass connection when the pressure of return fluid in said bore exceeds the pressure of the fluid in the fluid line coupled to said by-pass connection; a valve seat in said bore at a point between the ends thereof; a piston valve in said bore operating responsive to the introduction of pressure fluid into said bore for delivery to said one end of the cylinder through said passage, to engage said valve seat and shut off communication of the bore with said by-pass connection and by-pass check valve, and to be unseated and open said bore to communication with said by-pass connection when return fluid is delivered to said bore from said cylinder; a port in said piston valve affording the passage of return fluid through said bore and away from said body, while the check valve in said passage is closed; and a check valve controlling said port so that the port will be open only when the pressure of the fluid seating the by-pass check valve is greater than the pressure of the return fluid, said passage extending obliquely relative to said bore and having in it a valve chamber in which the first named check valve is mounted.

3. In a hydraulic by-pass valve, a valve body having a bore extended therethrough, connection means on said body for coupling the bore in series with a fluid line for conducting pressure fluid to and returning fluid from one end of a hydraulic cylinder, a passage in said body having its ends arranged to open into the end portions of said bore, a check valve intermediate the ends of said passage arranged to open incident to the flow of pressure fluid into said passage from said bore and to close responsive to the flow of return fluid into said passage from said bore, a by-pass connection on said body having communication with said bore, and adapted for coupling said bore with another fluid line through which pressure fluid is directed to and fluid is returned from the other end of the hydraulic cylinder, whereby return fluid may be directed from said one end of the cylinder to the other end of the cylinder; a by-pass check valve arranged to be seated to close said by-pass connection by pressure of fluid in the fluid line coupled to said by-pass connection and to be unseated and open said by-pass connection when the pressure of return fluid in said bore exceeds the pressure of the fluid in the fluid line coupled to said by-pass connection; a valve seat in said bore at a point between the ends thereof; a piston valve in said bore operating responsive to the introduction of pressure fluid into said bore for delivery to said one end of the cylinder through said passage, to engage said valve seat and shut off communication of the bore with said by-pass connection and by-pass check valve, and to be unseated and open said bore to communication with said by-pass connection when return fluid is delivered to said bore from said cylinder; a port in said piston valve affording the passage of return fluid through said bore and away from said body, while the check valve in said passage is closed; and a check valve controlling said port so that the port will be open only when the pressure of the fluid seating the by-pass check valve is greater than the pressure of the return fluid, said valve seat being of a smaller diameter than said bore, and the piston valve having a frusto-conical end to seat on said valve seat, said port opening through the center of said frusto-conical end.

4. In a hydraulic by-pass valve for controlling the flow of fluid in a hydraulic cylinder for aircraft landing gear which responds to gravitational forces while being extended, a valve body having a bore therein, means affording the connection of one end of said bore with a fluid line for conducting fluid to and from said bore, means for connecting the other end of said bore with a cylinder line for conducting fluid from said bore to the lower end of the cylinder for retracting the landing gear, through which cylinder line return fluid flows to said bore upon the extension of the landing gear, a by-pass port opening into said bore, a by-pass connection affording the connection of said port with a second cylinder line for conducting fluid to and returning it from the upper end of said cylinder, a by-pass check valve in said connection arranged to close said port responsive to pressure of fluid derived in said connection from the second cylinder line and to open said port responsive to the pressure of return fluid in said bore and port as derived upon gravitational extension of said landing gear, whereby fluid returned from the lower end of the cylinder is by-passed through said bore, said port and said connection to the upper end of the cylinder, a pressure fluid passage in said body having its ends opening into said bore adjacent the ends of the latter for conducting pressure fluid through the body for delivery to the lower end of the hydraulic cylinder to retract the landing gear, a check valve in said passage opening responsive to pressure fluid delivered to said bore through first named end of said bore and closing responsive to return fluid from the cylinder connected end of the bore, a valve seat in said bore between the by-pass port and the point where the pressure passage discharges pressure fluid into said bore, a piston valve mounted in said bore to engage said seat and shut off communication between said by-pass port and the cylinder connected end of said bore responsive to pressure fluid delivered to said bore through said one end of the bore and operating to open said cylinder connected end of the bore to communication with said seat responsive to the pressure of fluid returned to the bore during gravitational extension of the landing gear; said piston, said seat and said by-pass port being constructed and arranged so that a portion of the bore surrounding the piston affords communication of the port up to the point where the piston engages its seat whereby upon initial unseating movement of said piston the cylinder connected end of the bore is immediately brought into direct communication with said port, a relief passage within the body affording the discharge of return fluid from the cylinder connected end of the bore through the other end of the bore; and a normally closed check valve in said relief passage set to open only when the seating pressure on the by-pass check valve exceeds that of the return fluid pressure in the cylinder connected end of the bore, said relief passage extending axially through the piston and being exposed through the valve seat to the cylinder connected end of the bore when the piston valve is seated.

5. In a hydraulic by-pass valve for controlling the flow of fluid in a hydraulic cylinder for aircraft landing gear which responds to gravitational forces while being extended, a valve body having a bore therein, means affording the connection of one end of said bore with a fluid line for conducting fluid to and from said bore, means for connecting the other end of said bore with a cylinder line for conducting fluid from said bore to the lower end of the cylinder for retracting the landing gear, through which cylinder line return fluid flows to said bore upon the extension of the landing gear, a by-pass port opening into said bore, a by-pass connection affording the connection of said port with a second cylinder line for conducting fluid to and returning it from the upper end of said cylinder, a by-pass check valve in said connection arranged to close said port responsive to pressure fluid derived in said connection from the second cylinder line and to open said port responsive to the pressure of return fluid in said bore and port as derived upon gravitational extension of said landing gear, whereby fluid returned from the lower end of the cylinder is by-passed through said bore, said port and said connection to the upper end of the cylinder; a pressure fluid passage in said body having its ends opening into said bore adjacent the ends of the latter for conducting pressure fluid through the body for delivery to the lower end of the hydraulic cylinder to retract the landing gear, a check valve in said passage opening responsive to pressure fluid delivered to said bore through first named end of said bore and closing responsive to return fluid from the cylinder connected end of the bore, a valve seat in said bore between the by-pass port and the point where the pressure passage discharges pressure fluid into said bore, a piston valve mounted in said bore to engage said seat and shut off communication between said by-pass port and the cylinder connected end of said bore responsive to pressure fluid delivered to said bore through said one end of the bore and operating to open said cylinder connected end of the bore to communication with said seat responsive to the pressure fluid returned to the bore during gravitational extension of the landing gear; said piston, said seat and said by-pass port being so constructed and arranged that a portion of the bore surrounding the piston affords communication of the port up to the point where the piston engages its seat whereby upon initial unseating movement of said piston the cylinder connected end of the bore is immediately brought into direct communication with said port, a relief passage within the body affording the discharge of return fluid from the cylinder connected end of the bore through the other end of the bore; and a normally closed check valve in said relief passage set to open only when the seating pressure on the by-pass check valve exceeds that of the return fluid pressure in the cylinder connected end of the bore, said relief passage extending axially through the piston and being exposed through the valve seat to the cylinder connected end of the bore when the piston valve is seated.

6. The invention as set forth in claim 2 wherein the piston valve has a conical end portion to engage the valve seat therefor and the portion of the bore between the seated portion of said conical end portion and said by-pass connection is open whereby upon initial movement of the piston away from its seat the return fluid pressure has immediate access to said by-pass check valve.

7. In a hydraulic by-pass valve for controlling the flow of fluid in a hydraulic cylinder for aircraft landing gear which responds to gravitational forces while being extended, a valve body having a bore therein, means affording the connection of one end of said bore with a fluid line for conducting fluid to and from said bore, means for connecting the other end of said bore with a cylinder line for conducting fluid from said bore to the lower end of the cylinder for retracting the landing gear, through which cylinder line return fluid flows to said bore during extension of the landing gear, a by-pass port opening into said bore, a second cylinder line having a by-pass connection affording the connection of said port with said bore for conducting fluid to and returning it from the upper end of said cylinder, a by-pass check valve in said connection arranged to close said port responsive to pressure of fluid derived in said connection from the second cylinder line and to open said port responsive to the pressure of return fluid in said bore and port as derived upon gravitational extension of said landing gear, whereby fluid returned from the lower end of the cylinder is by-passed through said bore, said port and said connection to the upper end of the cylinder, a pressure fluid passage in said body having its ends opening into said bore adjacent the ends of the latter for conducting pressure fluid through the body for delivery to the lower end of the hydraulic cylinder to retract the landing gear, a check valve in said passage opening responsive to pressure fluid delivered to said bore through first named end of said bore and closing responsive to return fluid from the cylinder connected end of the bore, a valve seat in said bore between the by-pass port and the point where the pressure passage discharges pressure fluid into that end portion of said bore, which is connected with the lower end of the aforesaid hydraulic cylinder, a piston valve mounted in said bore to engage said seat and shut off communication between said by-pass port and the cylinder connected end of said bore responsive to pressure fluid delivered to said bore through said one end of the bore and operating to open said cylinder connected end of the bore to communication with said seat responsive to the pressure of fluid returned to the bore during gravitational extension of the landing gear; said piston, said seat and said by-pass port being constructed and arranged so that upon initial unseating movement of said piston the cylinder connected end of the bore is immediately brought into direct communication with said port, a relief passage within the body affording the discharge of return fluid from the cylinder connected end of the bore through the other end of the bore; and a normally closed check valve in said relief passage set to open only when the seating pressure on the by-pass check valve exceeds that of the return fluid pressure in the cylinder connected end of the bore.

OTTMAR A. KEHLE.